Oct. 26, 1943.    H. BIEDERBECK ET AL    2,332,887
PROCESS FOR SEPARATING CARBONIC ACID FROM GAS
MIXTURES CONTAINING CARBONIC ACID
Filed Jan. 16, 1940
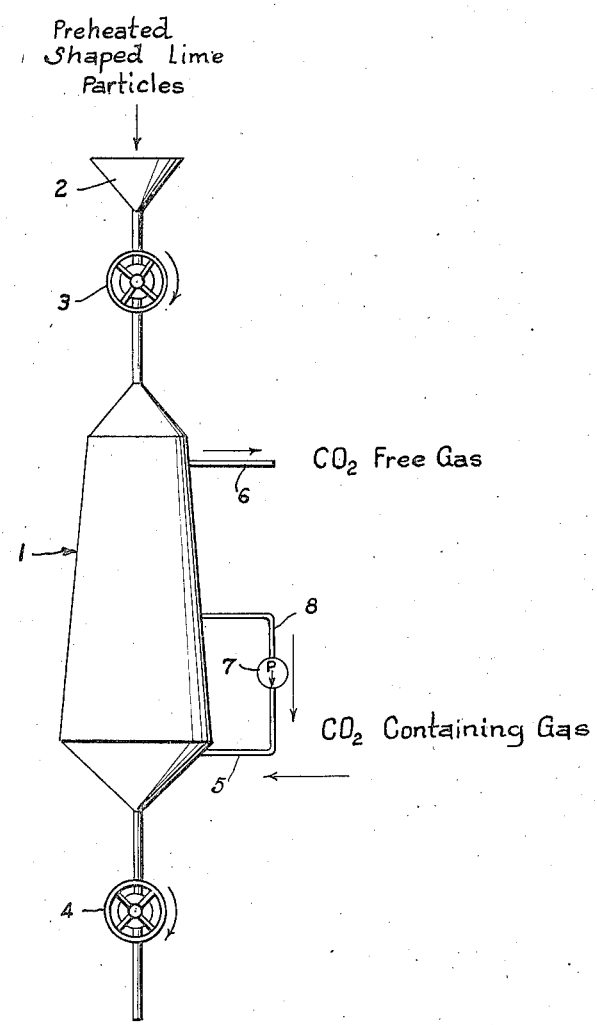
INVENTORS,
Heinrich Biederbeck & Georg Fischer
BY
ATTORNEYS Patented Oct. 26, 1943

2,332,887

UNITED STATES PATENT OFFICE 2,332,887

PROCESS FOR SEPARATING CARBONIC ACID FROM GAS MIXTURES CONTAINING CARBONIC ACID

Heinrich Biederbeck and Georg Fischer, Oberhausen-Holten, Germany; vested in the Alien Property Custodian Application January 16, 1940, Serial No. 314,182
In Germany January 2, 1939

6 Claims. (Cl. 23—2)

The separation of carbonic acid from gas mixtures with the aid of lime is known. For this purpose, calcium oxide is spread over trays, which are exposed to the current of gas. As soon as their absorptive capacity is exhausted, the trays are removed, and provided with fresh calcium oxide.

It has also been suggested that the gas to be freed from carbonic acid should be brought into contact with powdered calcium hydroxide, which is led in a circular course. In consequence of its higher specific weight the calcium carbonate being formed can be easily removed by sieving. In this way it is possible to lead the calcium hydroxide remained free back into the circular course for the absorption of carbonic acid.

It has now been found that carbonic acid can be thoroughly and satisfactorily separated, if the gases to be freed from it are led in countercurrent with the lime, the quantity of lime passing through the apparatus and the rate of flow of the gas to be purified being so adjusted that the reaction takes place chiefly in the upper part of the absorption apparatus.

Applicants have found that it is especially advantageous to apply the lime in the shape of globules. The fresh lime globules are sufficiently hardened in a short time in consequence of their absorption of carbonic acid, so that special binding matter, such as, e. g., cement, is not needed. The lime globules, immediately after their introduction into the absorption apparatus, have already hardened to such an extent that, during their course into the bottom of that apparatus, the pressure exercised by the lime globules that follow can not smash them, nor make them conglomerate. Notwithstanding the hardening of the lime globules, a considerable conversion into calcium carbonate, for instance up to 90% and more, is obtained in a surprising manner.

It is advisable to lengthen the time of contact betwen the lime globules and the gases containing carbonic acid in relation to the decrease of the percentage of free lime. This can be done, e. g., by applying an absorption apparatus having a cross section which becomes larger towards its base. It has been found that a tower which narrows towards its top, is specially advantageous; the lime globules being introduced at the top, and the gas, containing carbonic acid, coming in at the bottom. The gas freed from carbonic acid escapes from the top of the tower.

In an absorption tower constructed in this way, the rate of flow of the gas in the bottom of the tower is considerably lower than in the top. The lime globules, becoming harder and harder as they progress downwards, are longer in contact with the gases to be purified, in consequence of the gradually decreasing rate of flow of the gas in downward direction. In this way a considerable concentration of calcium carbonate is obtained, this concentration amounting to 90% $CaCO_3$ and more within the lime globules.

The time during which the lime is in contact with the gas containing carbonic acid can also be increased, by removing some of the gas, e. g., in the middle of the absorption tower, and by reintroducing it in a circular course at the bottom of the tower, if desired, with the fresh gas.

When introducing the lime globules, the difficulty arises that the surface of the globules becomes wet and loses its porosity in consequence of the absorption of water. Consequently the absorptive power of the lime globules is considerably decreased.

This difficulty can be avoided by drying the surface of the lime globules beforehand. Such a drying can take place for instance by exposing the lime globules to the atmosphere for some time. However, any other drying process may be applied, which removes the water layer on the surface of the lime globules.

In this way globules with a very high capacity for absorbing carbonic acid are obtained. By using these globules, the gases to be purified are practically completely freed from the carbonic acid. The absorption of $CO_2$ takes place by this means in the upper part of the reaction apparatus in a particularly intensive way.

If there is a considerable difference between the temperature of the gases to be dealt with and that of the lime globules to be introduced, the lime globules are preferably heated beforehand. Without such an adaptation the effect of having dried the lime globules beforehand is partly lost, as, in consequence of the condensation that results when they enter a warmer absorption apparatus, these lime globules are covered in an envelope of water, which impedes the penetration of the gas.

Example 1

A cylindrical tower, with a diameter of 25 cm. and a length of 2.5 m. was used for the absorption. The gas to be freed from the carbonic acid was introduced at the lower end of the tower with a rate of flow of 100 m.$^3$ per hour, and withdrawn from the top of the tower. The lime globules for absorbing the carbonic acid were introduced at the top of the tower and removed at the lower end after absorption had been completed.

The gas introduced at a temperature of about 15° was heated to about 18–20° C. in the bottom of the absorption tower in consequence of a minute conversion with the lime, whereas in the upper third part of the absorption tower the temperature of the reaction increased to 37°. It appeared therefrom that the absorption of the carbonic acid took place chiefly in the upper portion of the absorption tower. When examining the gas, it also appeared that about 80% of the carbonic acid contained in the gas was bound in the upper part of the absorption tower.

The gas leaving the absorption apparatus turned out to be practically free from carbonic acid. The lime globules removed at the bottom of the tower had been converted for about 90% into carbonate of calcium.

Example 2

A tower with a length of 5 m. having a diameter of 1 m. at the lower end, and of 50 cm. at the top, served for the absorption. The gas to be freed from the carbonic acid was introduced into the tower at the lower end, and withdrawn from the top of the tower. The lime globules for the absorption of the carbonic acid were introduced at the narrowed end of the tower and removed at the bottom of the tower after the absorption of the carbonic acid. The gas introduced had a rate of flow of 0.5 m. per second in the bottom, and of 2 m. per second in the narrow portion of the tower. About 40% of the calcium oxide was converted into carbonate of calcium in the upper part of the tower through the absorption of the carbonic acid by the globules. The degree of conversion had risen to about 95%, when the globules reached the bottom of the absorption tower. The gas leaving the tower was practically free from carbonic acid.

Example 3

Every hour 300 kg. lime, in the form of previously dried globules, were introduced by a suitable device into a vertical tube, with a diameter of 750 mm. and a height of 5000 mm. The lime globules passed through the tube and were removed at the lower end with the aid of an eduction device. 2000 m.$^3$ gas, containing about 2.5% of $CO_2$, were introduced per hour in an opposite direction. When lime globules, which had not been previously dried were used, the carbonic acid could only be partially separated, 0.6% $CO_2$ remaining in the gas. However, when using the lime globules previously dealt with according to this invention, the gas leaving the reaction tower was completely free from carbonic acid.

Our process can be conducted in an apparatus of the type shown in the accompanying drawing. The tower of our apparatus is shown generally at 1. This tower is fed at the top with shaped particles of lime, which are preferably preheated, by means of the feeding funnel 2. The lime particles enter the tower through the star wheel 3 and are passed downwardly through the tower in counter-current to an ascending stream of a $CO_2$-containing gas which is introduced at the bottom of the tower through the pipe line 4, while the $CO_2$-free gas leaves at the top of the tower through the line 6. The spent lime particles, converted largely to the carbonate, are removed from the bottom of the tower by means of the star wheel 4. If it is desired to recycle the gases, the pump 7 in by-pass line 8 is operated. This serves to withdraw gases from the center of the tower and to introduce them, together with the gas to be treated, through the line 5.

The process as described above admits the possibility of several modifications, without altering the scope of this invention.

Instead of globules other artificially shaped particles of lime may be used, for instance in the form of little sticks, cubes or other polyhedrons. The absorption apparatus may consist of a high tower, or of separate devices connected one behind the other, into which the lime globules are introduced with the aid of worms, paternoster works or conveying bands. At the lower end of the absorption apparatus, a water-seal may be provided, assuring a gas-proof removal of the saturated absorption bodies.

As to the size of the lime globules to be applied, a diameter of approximately 7–16 mm. for a globule has turned out to be especially advantageous. Under these conditions, the proportion between the absorption mass and the absorbing surface of the lime globules is the most practical and favourable.

Having now particularly described and ascertained the nature of said invention and the manner in which it can be performed, we declare that what we claim is:

1. The method of separating carbon dioxide from gas containing the same which comprises passing the gas upwardly through a vertical contact zone countercurrent to a mass of dry, artificially-shaped particles of lime, and controlling the relative rate of flow of lime particles and gas in such manner that substantially the major part of carbon dioxide absorption occurs in the portion of the contact zone adjacent the lime supply, the velocity of the gas flow increasing in the direction of the lime supply and the time of contact between solid and gas increasing in the direction of gas supply.

2. The method of separating carbon dioxide from gas containing the same which comprises passing the gas upwardly through a vertically extending contact zone countercurrent to a mass of dry, artificially-shaped particles of lime passing downwardly therethrough, and controlling the relative rates of flow of lime particles and gas in such manner that substantially the major part of carbon dioxide absorption occurs in the upper portion of the contact zone adjacent the lime supply, said contact zone being of substantial length compared with its cross-sectional area and of gradually diminishing cross-section from bottom to top, whereby the velocity of the gas flow increases as it approaches the lime supply and the time of contact between solid and gas increases in the direction of gas supply.

3. The process as in claim 2, wherein gas is withdrawn from the contact zone intermediate its ends and reintroduced along with untreated gas, in a circular course, at the bottom of said contact zone.

4. The method as in claim 1, wherein the lime is in the form of dried globules.

5. The method as in claim 1, wherein the lime is dried and preheated to a temperature corresponding to the gas temperature at the top of said contact zone before being supplied to the contact zone.

6. The method as in claim 2, wherein the lime is dried and preheated to a temperature corresponding to the gas temperature before being supplied to the contact zone.

HEINRICH BIEDERBECK.
GEORG FISCHER.